United States Patent
Gao et al.

(10) Patent No.: US 11,936,614 B2
(45) Date of Patent: Mar. 19, 2024

(54) METHOD AND APPARATUS FOR SENDING REPLY PACKET, COMPUTING DEVICE, AND STORAGE MEDIUM

(71) Applicant: Huawei Technologies Co., Ltd., Guangdong (CN)

(72) Inventors: Jianping Gao, Nanjing (CN); Wenhui Zhu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/811,411

(22) Filed: Jul. 8, 2022

(65) Prior Publication Data
US 2022/0345440 A1    Oct. 27, 2022

Related U.S. Application Data

(63) Continuation of application No. PCT/CN2020/140803, filed on Dec. 29, 2020.

(30) Foreign Application Priority Data

Jan. 10, 2020 (CN) .......................... 202010026742.7

(51) Int. Cl.
*H04L 61/2592* (2022.01)
*H04L 61/5014* (2022.01)

(52) U.S. Cl.
CPC ...... *H04L 61/2592* (2013.01); *H04L 61/5014* (2022.05)

(58) Field of Classification Search
CPC .......................... H04L 61/2592; H04L 61/5014
(Continued)

(56) References Cited

U.S. PATENT DOCUMENTS 7,610,363 B2 * 10/2009 Kim .................... H04L 61/5014
   455/436
7,899,923 B2 * 3/2011 Siegmund ............... H04L 61/59
   709/224
(Continued)

FOREIGN PATENT DOCUMENTS

CN     109495369 A    3/2019
JP     2017147492 A    8/2017

OTHER PUBLICATIONS

Anonymous: "VXLAN and BGP EVPN Configuration Guide for Dell EMC SmartFabric OS10" Aug. 1, 2019 (Aug. 1, 2019)XP093009506 total:129pages.

*Primary Examiner* — Tauqir Hussain
(74) *Attorney, Agent, or Firm* — WOMBLE BOND DICKINSON (US) LLP

(57) ABSTRACT

The disclosure discloses a network device, an apparatus, and a network system. The network device receives a reply packet sent by a DHCP service device, and determines a first next-hop address from a plurality of next-hop addresses corresponding to a destination IP address of the reply packet, where the first next-hop address is a first tunnel endpoint IP address of the relay device and is different from a tunnel endpoint IP address of another relay device in a target anycast group to which the relay device belongs, and a communication connection is established between each relay device in the target anycast group and the client. The network device may forward the reply packet to the relay device based on the first next-hop address.

13 Claims, 9 Drawing Sheets

(58) Field of Classification Search
USPC .......................................................... 709/230
See application file for complete search history.

(56) References Cited

U.S. PATENT DOCUMENTS

| | | | | |
|---|---|---|---|---|
| 8,856,384 | B2* | 10/2014 | Jiang | H04L 61/2528 |
| | | | | 709/219 |
| 10,447,591 | B2* | 10/2019 | Cohn | H04L 12/4633 |
| 10,448,352 | B1* | 10/2019 | Grayson | H04W 8/08 |
| 10,554,551 | B2* | 2/2020 | Makhijani | H04W 60/005 |
| 10,819,679 | B2* | 10/2020 | Peng | H04L 61/5076 |
| 11,284,462 | B2* | 3/2022 | Samuel | H04W 76/16 |
| 11,452,025 | B2* | 9/2022 | Pillay-Esnault | H04W 64/006 |
| 2008/0095160 | A1* | 4/2008 | Yadav | H04L 12/56 |
| | | | | 370/400 |
| 2016/0080505 | A1* | 3/2016 | Sahin | H04L 67/1027 |
| | | | | 709/229 |
| 2018/0091471 | A1* | 3/2018 | Hooda | H04L 61/5014 |
| 2019/0007368 | A1* | 1/2019 | Hooda | H04L 61/5014 |
| 2019/0312813 | A1* | 10/2019 | Ellis | H04L 43/08 |
| 2019/0342262 | A1* | 11/2019 | Peng | H04L 61/5076 |
| 2020/0044917 | A1* | 2/2020 | Peng | H04L 41/0803 |

* cited by examiner

METHOD AND APPARATUS FOR SENDING REPLY PACKET, COMPUTING DEVICE, AND STORAGE MEDIUM

CROSS-REFERENCE TO RELATED APPLICATIONS

This application is a continuation of International Application No. PCT/CN2020/140803, filed on Dec. 29, 2020, which claims priority to Chinese Patent Application No. 202010026742.7, filed on Jan. 10, 2020. The disclosures of the aforementioned applications are hereby incorporated by reference in their entireties.

TECHNICAL FIELD

This application relates to the field of network communication technologies, and in particular, to a method and an apparatus for sending a reply packet, a computing device, and a storage medium.

BACKGROUND

A dynamic host configuration protocol (DHCP) is a protocol for dynamically managing and configuring an internet protocol (IP) address of a client. The IP address includes an internet protocol version 4 (IPv4) address and an internet protocol version 6 (IPv6) address. As a network scale expands and a network technology develops, the DHCP is increasingly used. The DHCP may be applied to a DHCP relay anycast scenario. In this scenario, a client accesses a plurality of relay devices (that is, gateway devices), IP addresses of access sides of the plurality of relay devices are the same, and the plurality of relay devices present one device on a DHCP service side; in other words, IP addresses presented on the DHCP service side are the same.

In the DHCP relay anycast scenario, when applying for an IP address, the client may send an address request packet to a relay device by using a hash principle. After receiving the address request packet, the relay device may encapsulate, into the address request packet, an IP address that is presented by the relay device on a DHCP service side and an IP address of an interface on which the address request packet is received, add an IP address of a DHCP service device on the DHCP service side to the address request packet, and then send, through a tunnel and to a network device connected to the DHCP service side, the address request packet to which the IP address of the DHCP service device is added. After receiving the address request packet to which the IP address of the DHCP service device is added, the network device forwards the address request packet to the DHCP service side. The DHCP service device on the DHCP service side allocates an IP address to the client based on the IP address of the interface in the address request packet. Then, the IP address allocated to the client is encapsulated, and the IP address of the relay device that is carried in the address request packet is added as a destination address, to obtain a reply packet. The DHCP service device on the DHCP service side sends the reply packet to the network device. After receiving the reply packet, the network device may obtain the destination address of the reply packet, query a routing table, and determine a next hop. The network device sends the reply packet to the relay device, and the relay device sends the IP address in the reply packet to the client.

In the DHCP relay anycast scenario, the plurality of relay devices present the same IP address on the DHCP service side, and therefore, the reply packet may be sent to another relay device. If the another relay device sends the reply packet to the relay device that sends the address request packet, a detour situation exists for a forwarding path of the reply packet.

SUMMARY

Embodiments of this application provide a method and an apparatus for sending a reply packet, a computing device, and a storage medium. In this application, a detour situation of a forwarding path of a reply packet can be reduced.

According to a first aspect, a method for sending a reply packet is provided, where the method is applied to a network device connected to a DHCP service device, and the method includes:

The network device receives a reply packet sent by the DHCP service device, where a destination address of the reply packet is a first internet protocol IP address of a relay device, a communication connection is established between the relay device and a client, and the client is a client that applies to the DHCP service device for an IP address; the network device determines, based on the destination IP address of the reply packet, a plurality of next-hop addresses corresponding to the destination IP address, and determines a first next-hop address from the plurality of next-hop addresses, where the first next-hop address is a first tunnel endpoint IP address of the relay device and is different from a tunnel endpoint IP address of another relay device in a target anycast group to which the relay device belongs, and a communication connection is established between each relay device in the target anycast group and the client; and the network device forwards the reply packet to the relay device based on the first next-hop address.

In the solution shown in this application, after receiving an address request packet, the DHCP service device may generate a reply packet corresponding to the address request packet. The reply packet includes an IP address allocated to the client that applies for the IP address, a destination address of the reply packet is the first IP address of the relay device, a communication connection is established between the relay device and the client, and the address request packet is sent by the relay device to the DHCP service device. The DHCP service device sends the reply packet to the connected network device. The network device receives the reply packet sent by the DHCP service device. The network device may view the destination IP address of the reply packet, and then search a routing table, and determine, in the routing table, that the destination IP address corresponds to a plurality of next-hop addresses. The network device may determine a first next-hop address from the plurality of next-hop addresses, where the first next-hop address is the first tunnel endpoint IP address of the relay device, and the first tunnel endpoint IP address is different from a tunnel endpoint IP address of another relay device in the target anycast group to which the relay device belongs. The network device may forward, by using the first next-hop address, the reply packet to a relay device to which the destination address of the reply packet belongs.

In this way, because the first tunnel endpoint IP address is different from the tunnel endpoint IP address of the another relay device in the target anycast group to which the relay device belongs, the reply packet is not sent to the another relay device in the target anycast group, so that the reply packet does not detour.

In an embodiment, the network device determines the first next-hop address from the plurality of next-hop addresses based on a straight-through mark.

In an embodiment, the network device receives a first route advertisement message through a first tunnel to which the first tunnel endpoint IP address belongs, where the first route advertisement message includes the first IP address, the first tunnel endpoint IP address, and a straight-through mark corresponding to the first tunnel endpoint IP address, and tunnel endpoints of the first tunnel are the relay device and the network device; and stores the first tunnel endpoint IP address as the first next-hop address of the first IP address, and adds the straight-through mark to the first tunnel endpoint IP address.

In the solution shown in this application, after receiving the first route advertisement message, if the network device determines that a destination address is an IP address of the network device, the network device may obtain the first IP address of the relay device and the straight-through mark by parsing the first route advertisement message, and may learn, through parsing, that a source address is the first tunnel endpoint IP address. Then, the network device may add the first IP address to the routing table, and store, in the routing table, the first tunnel endpoint IP address as the first next-hop address of the first IP address, and the first tunnel endpoint IP address corresponds to the straight-through mark. In this way, the network device stores a next-hop address of the first IP address, and the next-hop address corresponds to a straight-through mark.

In an embodiment, the network device receives a second route advertisement message through a second tunnel to which a second tunnel endpoint IP address belongs, where the second route advertisement message includes the first IP address and the second tunnel endpoint IP address, tunnel endpoints of the second tunnel are the relay device and the network device, and the second tunnel endpoint IP address is a tunnel endpoint IP address that is the same for each relay device in the target anycast group; and stores the second tunnel endpoint IP address as a second next-hop address of the first IP address.

In the solution shown in this application, after receiving the second route advertisement message, if the network device determines that a destination address is the IP address of the network device, the network device may obtain the first IP address of the relay device and the straight-through mark by parsing the second route advertisement message, and may learn, through parsing, that a source address is the second tunnel endpoint IP address. Then, the network device may add the first IP address to the routing table, and store, in the routing table, the second tunnel endpoint IP address as the second next-hop address of the first IP address. In this way, the network device stores another next-hop address of the first IP address.

In an embodiment, the network device receives, through the first tunnel to which the first tunnel endpoint IP address belongs or the second tunnel, an encapsulated address request packet sent by the relay device, where a destination address of the encapsulated address request packet is an IP address of the DHCP service device; and the network device sends the encapsulated address request packet to the DHCP service device.

In this way, the network device may receive the address request packet in a plurality of manners.

According to a second aspect, a method for sending a route advertisement message is provided, where the method is applied to a relay device, and the method includes:

The relay device generates a plurality of route advertisement messages, where each of the plurality of route advertisement messages includes a first IP address of the relay device and one tunnel endpoint IP address of the relay device, each route advertisement message includes a different tunnel endpoint IP address of the relay device, a tunnel endpoint IP address included in a first route advertisement message in the plurality of route advertisement messages is a first tunnel endpoint IP address, the first tunnel endpoint IP address is different from a tunnel endpoint IP address of another relay device in a target anycast group to which the relay device belongs, and a communication connection is established between each relay device in the target anycast group and a client that applies for an IP address; and sends the plurality of route advertisement messages to a network device, to indicate the network device to send a reply packet to the relay device by using the first tunnel endpoint IP address in the first route advertisement message, where the reply packet is sent by a DHCP service device to the network device, and a destination IP address of the reply packet is the first IP address.

In the solution shown in this application, the relay device may generate a corresponding quantity of route advertisement messages based on a quantity of tunnels established between the relay device and the network device, and each route advertisement message includes the first IP address of the relay device and one tunnel endpoint IP address of the relay device. The tunnel endpoint IP address included in the first route advertisement message in the plurality of route advertisement messages is the first tunnel endpoint IP address, the first tunnel endpoint IP address is different from the tunnel endpoint IP address of the another relay device in the target anycast group to which the relay device belongs, and a communication connection is established between each relay device in the target anycast group and the client that applies for the IP address. The relay device may send the plurality of route advertisement messages to the network device. After receiving the plurality of route advertisement messages, the network device may record that the first tunnel endpoint IP address in the first route advertisement message is a next-hop address of the reply packet to be sent to the relay device. In this way, the network device may subsequently send the reply packet to the relay device by using the first tunnel endpoint IP address, to reduce a detour situation of the reply packet.

In an embodiment, the relay device receives the reply packet sent by the network device based on the first tunnel endpoint IP address, and sends, to the client based on a media access control (MAC) address that is of the client and that corresponds to the reply packet, an IP address that is in the reply packet and that is allocated by the DHCP service device to the client.

In the solution shown in this application, the relay device may send, to the client based on a MAC address in an established temporary user table, the IP address that is in the reply packet and that is allocated to the client. In this way, an address request packet used by the client to apply for the IP address passes through a same relay device as the reply packet, so that the reply packet does not detour.

In an embodiment, the IP address allocated to the client is an IPv4 address or an IPv6 address. In this way, detour can be reduced for both a reply packet for applying for the IPv4 address and a reply packet for applying for the IPv6 address.

In an embodiment, the first route advertisement message further includes a straight-through mark corresponding to the first tunnel endpoint IP address.

In an embodiment, the plurality of route advertisement messages include the first route advertisement message and a second route advertisement message. The relay device sends the first route advertisement message to the network device through a first tunnel to which the first tunnel endpoint IP address belongs, and sends the second route advertisement message to the network device through a second tunnel to which a second tunnel endpoint IP address belongs, where tunnel endpoints of the first tunnel and the second tunnel are the relay device and the network device, and the second tunnel endpoint IP address is a tunnel endpoint IP address that is the same for each relay device in the target anycast group.

In the solution shown in this application, the relay device may add the first IP address of the relay device to the first route advertisement message, and encapsulate the first tunnel endpoint IP address as a source IP address of the first route advertisement message; in other words, the first route advertisement message includes the first IP address of the relay device and the first tunnel endpoint IP address. A destination address of the first route advertisement message is a tunnel endpoint IP address of the network device. The relay device sends the first route advertisement message to the network device through the first tunnel. In this way, the relay device may advertise the first address of the relay device to a peer device (namely, the network device) of the first tunnel.

The relay device may add the first IP address of the relay device to the second route advertisement message, and encapsulate the second tunnel endpoint IP address as a source IP address of the second route advertisement message; in other words, the second route advertisement message includes the first IP address of the relay device and the second tunnel endpoint IP address. A destination address of the second route advertisement message is the tunnel endpoint IP address of the network device. The relay device sends the second route advertisement message to the network device through the second tunnel. In this way, the relay device may advertise the first address of the relay device to a peer device (namely, the network device) of the second tunnel.

In this way, the network device may be enabled to correspond to the first address and store two next-hop addresses.

In an embodiment, the relay device receives an address request packet sent by the client; encapsulates the first IP address and a second IP address into the address request packet, where the second IP address is an IP address of an interface on which the relay device receives the address request packet; encapsulates an IP address of the DHCP service device as a destination address of the address request packet; and forwards the encapsulated address request packet to the network device through the first tunnel or the second tunnel based on the destination address.

In this way, the relay device can send the address request packet to the DHCP service device.

According to a third aspect, this application provides an apparatus for sending a reply packet, applied to a network device. The apparatus includes a plurality of modules, and the plurality of modules implement, by executing instructions, the method for sending a reply packet provided in the first aspect.

According to a fourth aspect, this application provides an apparatus for sending a reply packet, applied to a relay device. The apparatus includes a plurality of modules, and the plurality of modules implement, by executing instructions, the method for sending a route advertisement message provided in the second aspect.

According to a fifth aspect, this application provides a computing device. The computing device includes a memory and a processor, and the processor executes computer instructions stored in the memory, so that the computing device is enabled to perform the method for sending a reply packet according to the first aspect.

According to a sixth aspect, this application provides a computing device. The computing device includes a memory and a processor, and the processor executes computer instructions stored in the memory, so that the computing device is enabled to perform the method for sending a route advertisement message according to the second aspect.

According to a seventh aspect, a computer-readable storage medium is provided. The computer-readable storage medium stores computer instructions. When the computer instructions in the computer-readable storage medium are executed by a computing device, the computing device is enabled to perform the method for sending a reply packet according to the first aspect, or the computing device is enabled to implement functions of the apparatus according to the third aspect.

According to an eighth aspect, a computer-readable storage medium is provided. The computer-readable storage medium stores computer instructions. When the computer instructions in the computer-readable storage medium are executed by a computing device, the computing device is enabled to perform the method for sending a route advertisement message according to the second aspect, or the computing device is enabled to implement functions of the apparatus according to the fourth aspect.

According to a ninth aspect, this application provides a computer program product. The computer program product includes computer instructions, and when the computer instructions are executed by a computing device, the computing device is enabled to perform the method for sending a reply packet according to the first aspect.

According to a tenth aspect, this application provides a computer program product. The computer program product includes computer instructions, and when the computer instructions are executed by a computing device, the computing device is enabled to perform the method for sending a route advertisement message according to the second aspect.

According to an eleventh aspect, a system for sending a reply packet is provided, and the system includes a network device and a relay device. The network device is the network device according to the third aspect, and the relay device is the relay device according to the fourth aspect.

DESCRIPTION OF EMBODIMENTS

To make the objectives, technical solutions, and advantages of this application clearer, the following further describes the embodiments of this application in detail with reference to the accompanying drawings.

For ease of understanding of embodiments of this application, the following first describes concepts of terms used.

DHCP is a protocol for dynamically managing and configuring an IP address (such as an IPv4 address or an IPv6 address) of a client.

Anycast is to allocate an IP address to hosts at different physical locations in a same network, and packets sent to the host are routed to "nearest" hosts by the network.

DHCP relay anycast scenario: In this scenario, a client accesses a plurality of relay devices, and access-side IP addresses of the plurality of relay devices are the same. The plurality of relay devices present one device on a DHCP service side; in other words, IP addresses presented on the DHCP service side are the same. Generally, a tunnel technology is used to forward a packet between a network device connected to a DHCP service device (that is, a device that allocates an IP address to the client) and the plurality of relay devices, and the plurality of relay devices embody anycast for the network device. For example, as shown in FIG. 1, a client accesses a relay device 1 and a relay device 2, and IP addresses of the client for accessing the relay device 1 and the relay device 2 are both IP1; a DHCP service device is connected to a network device; tunnels are established between the network device and each of the relay device 1 and the relay device 2; and the relay device 1 and the relay device 2 present a same IP address for the network device; in other words, the relay device 1 and the relay device 2 embody anycast for the network device.

Figure 1:
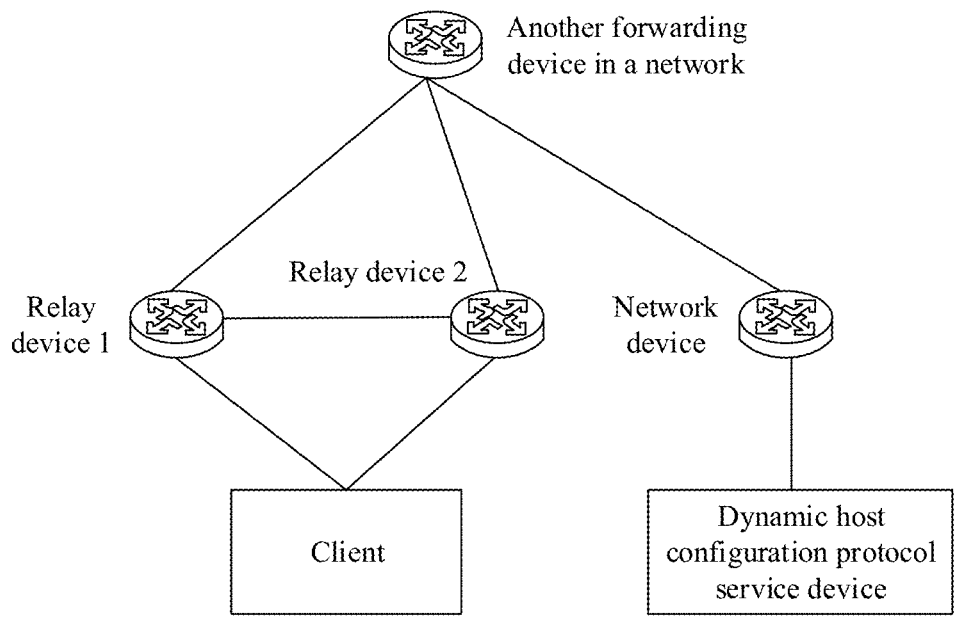
FIG. 1 is a schematic diagram of a DHCP relay anycast scenario according to an example embodiment of this application.

In a related technology, in FIG. 1, when the client applies for an IP address, the client sends an address request packet to the relay device 1 based on a hash principle. After receiving the address request packet, the relay device 1 may encapsulate, into the address request packet, an IP address (an IP address that is unique in an entire network) of the relay device 1 and an IP address of an interface on which the address request packet is received, and add an IP address of the DHCP service device (as a destination IP address of the address request packet). Then, the relay device 1 may send, through a tunnel and to the network device connected to the DHCP service device, the address request packet to which the IP address of the DHCP service device is added. After receiving the address request packet to which the IP address of the DHCP service device is added, the network device forwards the address request packet to the DHCP service device. The DHCP service device allocates an IP address to the client based on the IP address of the interface in the address request packet. Then, the IP address allocated to the client is encapsulated, and the IP address of the relay device 1 that is carried in the address request packet is added as a destination address, to obtain a reply packet. The DHCP service device sends the reply packet to the network device. After receiving the reply packet, the network device may obtain the destination address of the reply packet, query a routing table, and determine a next hop. The network device sends a reply packet 1 to the relay device based on the next hop. Because the relay device 1 and the relay device 2 present a same IP address for the network device, the next hop determined by the network device is the same IP address of the relay device 1 and the relay device 2. Therefore, the reply packet is very likely to be sent to the relay device 2, and is sent to the relay device 1 through the relay device 2. This causes a case in which the reply packet detours. Therefore, a method for sending a reply packet needs to be provided, to reduce a probability that the reply packet detours.

A method for sending a reply packet is provided in this application. The method may be performed by a network device and/or a relay device, and the relay device may be a gateway device. The network device may be a software apparatus, or may be a hardware apparatus. When the network device is a hardware apparatus, the network device may be a router, a switch, or the like implemented by using hardware. When the network device is a software apparatus, the network device may be a router, a switch, or the like implemented by using software. The relay device may be a software apparatus, or may be a hardware apparatus. When the relay device is a hardware apparatus, the relay device may be a server, a computing device, a terminal, or the like. When the relay device is a software apparatus, the software apparatus may be installed on a server, a computing device, or the like.

In addition, embodiments of this application further relate to a DHCP service device. The DHCP service device may be a software apparatus, or may be a hardware apparatus. When the DHCP service device is a software apparatus, the DHCP service device may be a program that is installed on a router, a switch, or a server and that is used to allocate an IP address to a client. When the DHCP service device is a hardware apparatus, the DHCP service device may be a router, a switch, a server, or the like implemented by using hardware.

Figure 2:
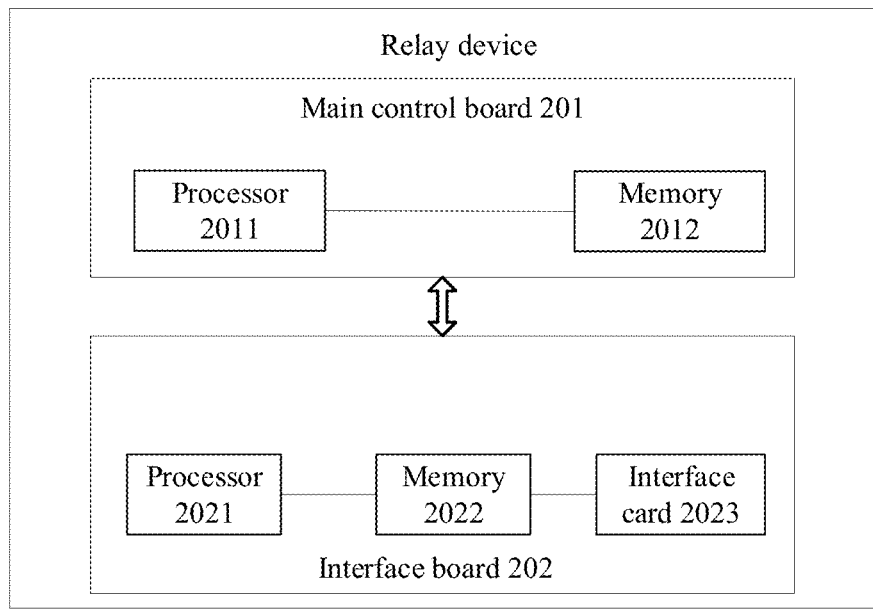
FIG. 2 is a schematic diagram of a structure of a relay device according to an example embodiment of this application.

When the relay device is a hardware apparatus, as shown in FIG. 2, a schematic diagram of a structure of a router or a switch is provided. The relay device includes a main control board 201 and an interface board 202, and the main control board 201 includes a processor 2011 and a memory 2012. The interface board 202 includes a processor 2021, a memory 2022, and an interface card 2023. A communication connection is established between the main control board 201 and the interface board 202.

The processor 2011 may be a central processing unit (CPU), an application-specific integrated circuit (ASIC), or the like. The processor 302 may include one or more chips. The memory 2012 may be a read only memory (ROM), a static storage device, a dynamic storage device, or a random access memory (RAM). The memory 2012 may store computer instructions. When the computer instructions stored in the memory 2012 are executed by the processor 201, the processor 201 performs a method for sending a reply packet and a method for sending a route advertisement message.

The processor 2021 may be a CPU, an application-specific integrated circuit ASIC, or the like. The processor 2021 may include one or more chips. The memory 2022 may be a ROM, a static storage device, a dynamic storage device, or a RAM. The memory 2022 may store computer instructions. When the computer instructions stored in the memory 2022 are executed by the processor 2021, the processor 2021 performs a method for sending a reply packet and a method for sending a route advertisement message. The interface board can receive and send a packet.

Figure 3:
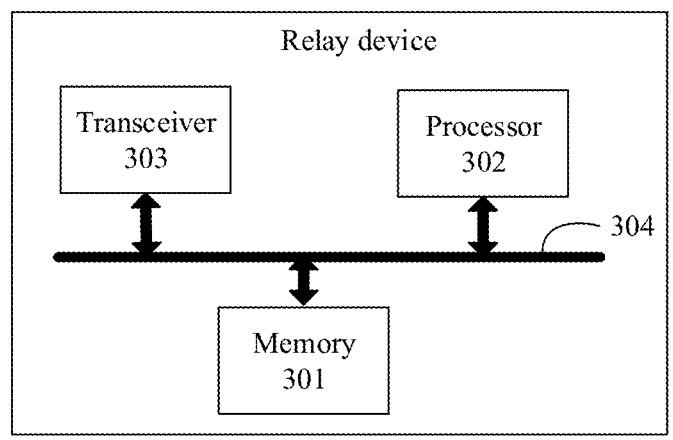
FIG. 3 is a schematic diagram of a structure of a relay device according to an example embodiment of this application.

When the relay device is a hardware apparatus, as shown in FIG. 3, a schematic diagram of another structure of a router or a switch is further provided. The relay device includes a memory 301, a processor 302, a transceiver 303, and a bus 304. Communication connections between the memory 301, the processor 302, and the transceiver 303 are implemented by using the bus 304.

The memory 301 may be a ROM, a static storage device, a dynamic storage device, or a RAM. The memory 301 may store computer instructions. When the computer instructions stored in the memory 301 are executed by the processor 302, the processor 302 and the transceiver 303 are configured to perform a method for sending a reply packet and a method for sending a route advertisement message. The memory may further store data. For example, a part of the memory 301 is configured to store data required by the method for sending a reply packet and the method for sending a route advertisement message, and is configured to store intermediate data or result data in a program execution process.

The processor 302 may be a common CPU, an application ASIC, a graphics processing unit (GPU), or any combination thereof. The processor 302 may include one or more chips.

The transceiver 303 is, for example, but is not limited to, a transceiver module such as a transceiver, to implement communication between a relay device and another device or another communications network. For example, data required for sending a reply packet may be obtained by using the transceiver 303.

The bus 304 may include a path for transmitting information between components (for example, the memory 301, the processor 302, and the transceiver 303) of the relay device.

Figure 4:
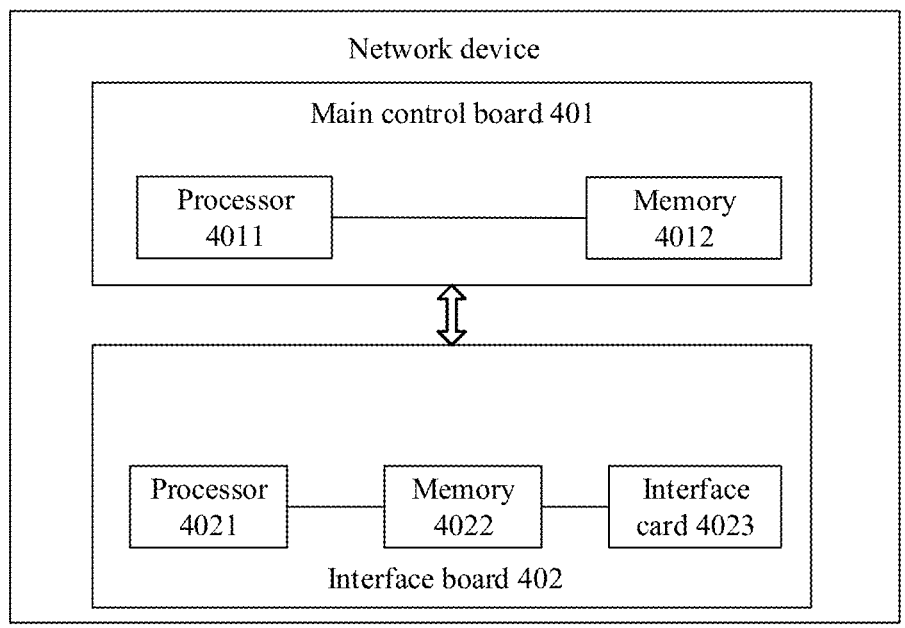
FIG. 4 is a schematic diagram of a structure of a network device according to an example embodiment of this application.

When the network device is a hardware apparatus, as shown in FIG. 4, a schematic diagram of a structure of a router or a switch is provided. The network device includes a main control board 401 and an interface board 402, and the main control board 401 includes a processor 4011 and a memory 4012. The interface board 402 includes a processor 4021, a memory 4022, and an interface card 4023. A communication connection is established between the main control board 401 and the interface board 402.

The processor 4011 may be a central processing unit, an application-specific integrated circuit, or the like. The processor 302 may include one or more chips. The memory 4012 may be a read-only memory, a static storage device, a dynamic storage device, or a random access memory. The memory 4012 may store computer instructions. When the computer instructions stored in the memory 4012 are executed by the processor 401, the processor 401 performs a method for sending a reply packet.

The processor 4021 may be a CPU, an application-specific integrated circuit ASIC, or the like. The processor 4021 may include one or more chips. The memory 4022 may be a ROM, a static storage device, a dynamic storage device, or a RAM. The memory 4022 may store computer instructions. When the computer instructions stored in the memory 4022 are executed by the processor 4021, the processor 4021 performs a method for sending a reply packet. The interface board can receive and send a packet.

Figure 5:
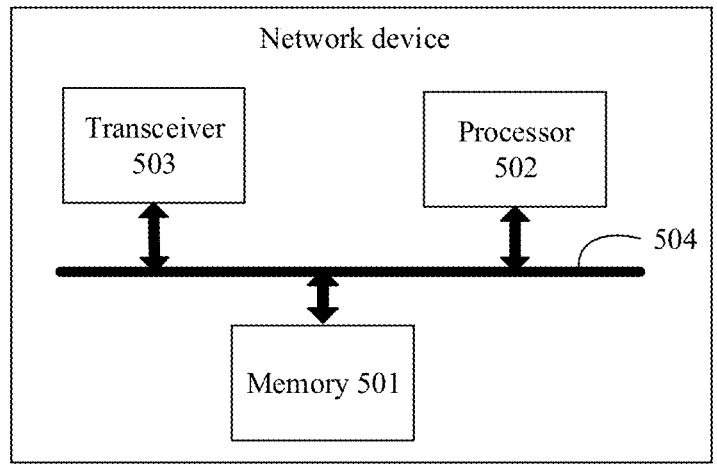
FIG. 5 is a schematic diagram of a structure of a network device according to an example embodiment of this application.

When the network device is a hardware apparatus, as shown in FIG. 5, a schematic diagram of another structure of a router or a switch is further provided. The network device includes a memory 501, a processor 502, a transceiver 503, and a bus 504. Communication connections between the memory 501, the processor 502, and the transceiver 503 are implemented by using the bus 504.

The memory 501 may be a ROM, a static storage device, a dynamic storage device, or a RAM. The memory 501 may store computer instructions. When the computer instructions stored in the memory 501 are executed by the processor 502, the processor 502 and the transceiver 503 are configured to perform a method for sending a reply packet. The memory may further store data. For example, a part of the memory 501 is configured to store data required by the method for sending a reply packet, and is configured to store intermediate data or result data in a program execution process.

The processor 502 may be a common CPU, an application ASIC, a graphics processing unit, or any combination thereof. The processor 502 may include one or more chips.

The transceiver 503 is, for example, but is not limited to, a transceiver module such as a transceiver, to implement communication between the network device and another device or another communications network. For example, data required for sending a reply packet may be obtained by using the transceiver 503.

The bus 504 may include a path for transmitting information between components (for example, the memory 501, the processor 502, and the transceiver 503) of the network device.

Figure 6:
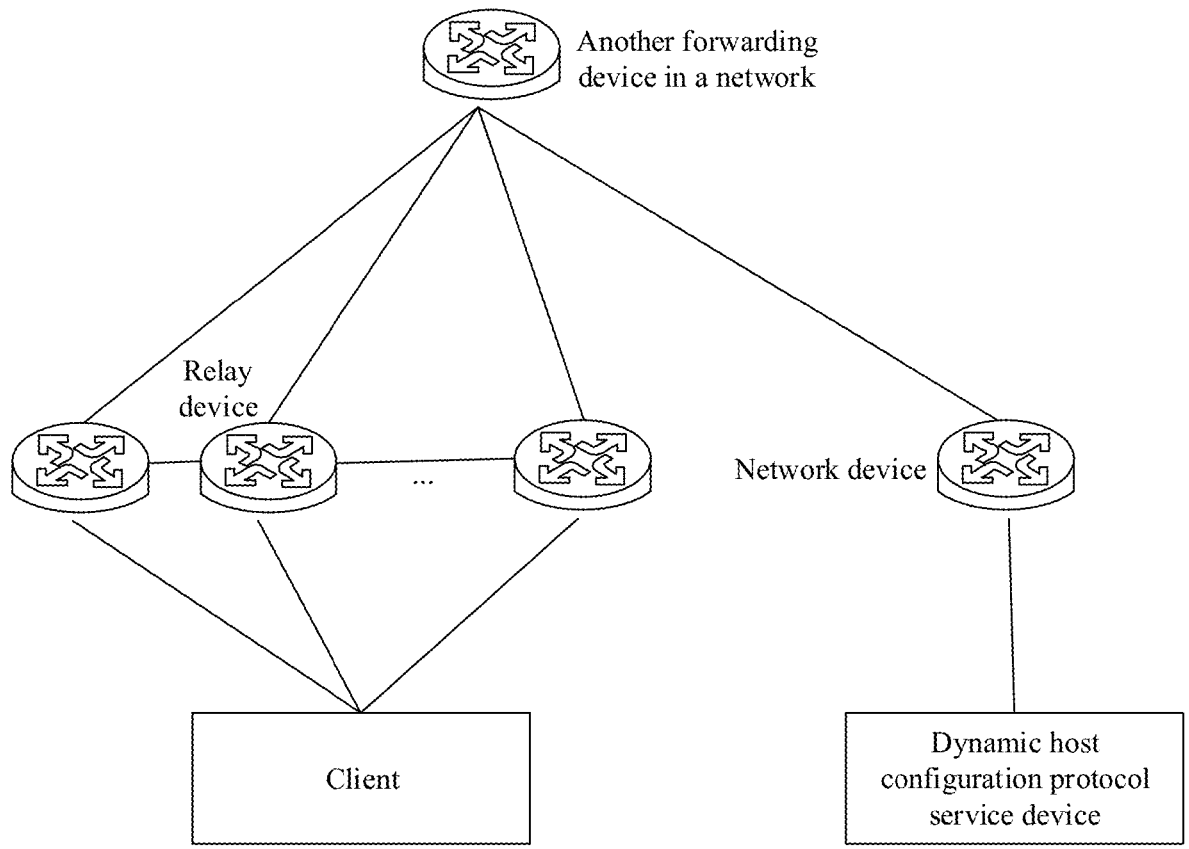
FIG. 6 is a schematic diagram of an application scenario according to an example embodiment of this application.

A method for sending a reply packet is provided in an embodiment of this application. The reply packet is a reply packet corresponding to an address request packet. As shown in FIG. 6, a client may establish communication connections to a plurality of relay devices (another forwarding device may exist between the client and the relay device). Packets are forwarded between the client and the plurality of relay devices based on a layer-2 network, and IP addresses of the client for accessing the plurality of relay devices are the same. Packets are forwarded between a network device connected to a DHCP service device and the plurality of relay devices based on a tunnel technology, and the plurality of relay devices embody anycast for the network device connected to the DHCP service device. Another forwarding device may exist between the network device and the DHCP service device. A packet may be forwarded between the network device and the DHCP service device based on the layer-2 network, or may be forwarded based on a layer-3 network. This is not limited in this embodiment of this application.

Figure 7:
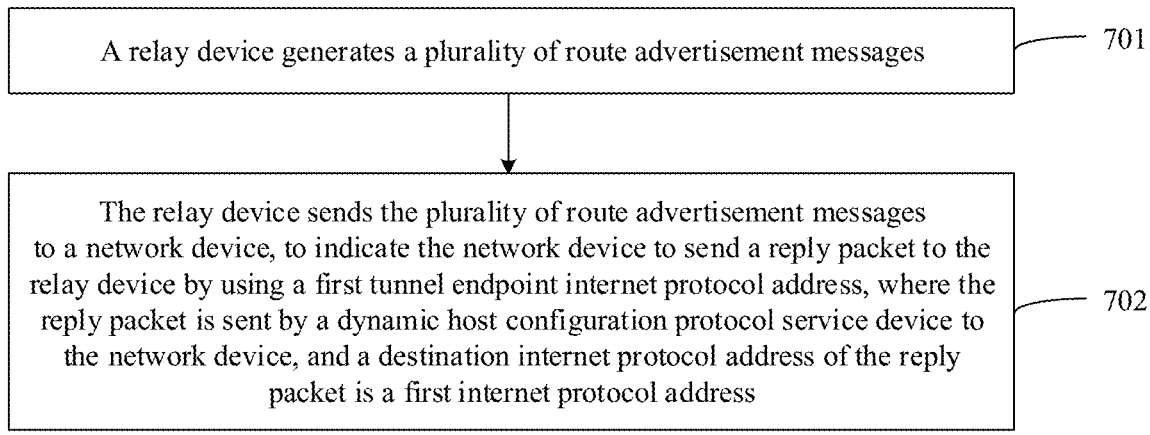
FIG. 7 is a schematic flowchart of a method for notifying an IP address according to an example embodiment of this application.

In this embodiment of this application, that the plurality of relay devices are two relay devices (a relay device 1 and a relay device 2) is used as an example. A process in which the relay device advertises an IP address to a network device connected to a DHCP service device is described below with reference to FIG. 7.

Operation 701: A relay device generates a plurality of route advertisement messages.

In this embodiment, a relay device 1 and a relay device 2 form a target anycast group. A communication connection is established between each of the relay device 1 and the relay device 2 and a client that applies for an IP address, and the IP address applied for by the client is an IPv4 address or an IPv6 address. A person skilled in the art configures tunnel endpoint IP addresses (IP2) on the relay device 1 and the relay device 2; the person skilled in the art configures, on the relay device 1, a tunnel endpoint IP address (IP3) that belongs to the relay device 1; and the person skilled in the art configures, on the relay device 2, a tunnel endpoint IP address (IP4) that belongs to the relay device 2. IP3 and IP4 are different. IP3 of the relay device 1 is an IP address that is unique in an entire network, and IP4 of the relay device 2 is an IP address that is unique in the entire network. In this way, the relay device 1 and the relay device 2 have a same tunnel endpoint IP address (IP2), and the relay device 1 and the relay device 2 also have different tunnel endpoint IP addresses. The IP address 3 of the relay device 1 is a first tunnel endpoint IP address of the relay device 1 in the following descriptions, and IP4 of the relay device 2 is a first tunnel endpoint IP address of the relay device 2 in the following descriptions.

After the relay device 1 is accessed, the relay device 1 may generate a plurality of route advertisement messages, and each route advertisement message includes a first IP address of the relay device 1 (the first IP address of the relay device 1 is an IP address configured on the relay device 1 (for example, the IP address is an IP address on a loopback interface)). A source IP address in each route advertisement message is one tunnel endpoint IP address of the relay device 1, and the source IP address in each route advertisement message is different. In this way, it is equivalent to that each route advertisement message includes a first IP address of the relay device 2 and one tunnel endpoint IP address of the relay device 1. In addition, when the relay device includes two tunnel endpoint IP addresses (an IP address 2 and an IP address 3), because the relay device 1 has only two tunnel endpoint IP addresses, the relay device 1 generates only two route advertisement messages.

Similarly, for processing of the relay device 2, refer to the processing process of the relay device 1. Details are not described herein again.

Operation 702: The relay device sends the plurality of route advertisement messages to a network device, to indicate the network device to send a reply packet to the relay device by using a first tunnel endpoint IP address, where the reply packet is sent by a DHCP service device to the network device, and a destination IP address of the reply packet is the first IP address.

In this embodiment, the relay device 1 sends the generated plurality of route advertisement messages to the network device. After receiving the plurality of route advertisement messages sent by the relay device 1, the network device may parse the plurality of route advertisement messages, obtain the first IP address of the relay device 1 from the plurality of route advertisement messages, and obtain a tunnel endpoint IP address in each route advertisement message. Then, the network device records each tunnel endpoint IP address as a next-hop address of the first IP address of the relay device 1. In this way, when the relay device 1 has a plurality of tunnel endpoint IP addresses, the network device records a plurality of next-hop addresses (namely, IP addresses 2 and IP addresses 3) for the first IP address of the relay device 1.

Similarly, the network device records a plurality of next-hop addresses (namely, IP addresses 2 and IP addresses 4) for a first IP address of the relay device 2.

In an embodiment, the first route advertisement message further includes a straight-through mark corresponding to the first tunnel endpoint IP address. In this way, after receiving the first route advertisement message, the network device stores the straight-through mark when storing the first tunnel endpoint IP address as the next-hop address of the first IP address.

In addition, in an embodiment, another route advertisement message in the plurality of route advertisement messages except the first route advertisement message further includes a non-straight-through mark corresponding to the tunnel endpoint IP address. In this way, after receiving the another route advertisement message, the network device stores the non-straight-through mark when storing the tunnel endpoint IP address as the next-hop address of the first IP address, and stores the straight-through mark when storing the first tunnel endpoint IP address as the next-hop address of the first IP address.

In an embodiment, the route advertisement messages generated by the relay device 1 include a first route advertisement message and a second route advertisement message, and processing in operation 702 may be:

sending the first route advertisement message to the network device through a first tunnel to which the first tunnel endpoint IP address belongs, and sending the second route advertisement message to the network device through a second tunnel to which a second tunnel endpoint IP address belongs, where tunnel endpoints of the first tunnel and the second tunnel are the relay device and the network device, and the second tunnel endpoint IP address is a tunnel endpoint IP address that is the same for each relay device in the target anycast group.

In this embodiment, the first tunnel and the second tunnel are established between the relay device 1 and the network device. A tunnel endpoint IP address of the first tunnel on a side of the relay device 1 is the first tunnel endpoint IP address. A tunnel endpoint IP address of the second tunnel on the side of the relay device 1 is the second tunnel endpoint IP address. A process of establishing the first tunnel and the second tunnel may be manually configured, and certainly, another manner may be used. This is not limited in this embodiment of this application. In addition, the first tunnel and the second tunnel may be virtual extensible local area network (vxlan) tunnels.

The relay device 1 may add the first IP address of the relay device 1 to the first route advertisement message, and encapsulate the first tunnel endpoint IP address as a source IP address of the first route advertisement message; in other words, the first route advertisement message includes the first IP address of the relay device 1 and the first tunnel endpoint IP address. A destination address of the first route advertisement message is a tunnel endpoint IP address of the network device. The relay device 1 sends the first route advertisement message to the network device through the first tunnel. In this way, the relay device 1 may advertise the first address of the relay device 1 to a peer device (namely, the network device) of the first tunnel.

The relay device 1 may add the first IP address of the relay device 1 to the second route advertisement message, and encapsulate the second tunnel endpoint IP address as a source IP address of the second route advertisement message; in other words, the second route advertisement message includes the first IP address of the relay device 1 and the second tunnel endpoint IP address. A destination address of the second route advertisement message is the tunnel endpoint IP address of the network device. The relay device 1 sends the second route advertisement message to the network device through the second tunnel. In this way, the relay device 1 may advertise the first address of the relay device 1 to a peer device (namely, the network device) of the second tunnel.

It should be noted that, a command may be added on an interface (for example, a loopback interface) to which the first IP address of the relay device 1 belongs, to indicate the relay device 1 to send the first route advertisement message to the network device through the first tunnel. Certainly, another manner may also be used. For example, if the relay device detects that a plurality of tunnel endpoint IP addresses are configured, the relay device separately advertises the plurality of tunnel endpoint IP addresses to the network device based on tunnels to which the plurality of tunnel endpoint IP addresses belong. This is not limited in this embodiment of this application. The added command may be directly stored in the relay device 1 by a person skilled in the art, or may be delivered to the relay device 1 by using a controller.

In an embodiment, processing in which the network device receives the first route advertisement message sent by the relay device 1 may be as follows:

The network device receives the first route advertisement message through the first tunnel to which the first tunnel endpoint IP address belongs, where the first route advertisement message includes the first IP address, the first tunnel endpoint IP address, and a straight-through mark corresponding to the first tunnel endpoint IP address, and tunnel endpoints of the first tunnel are the relay device and the network device; and stores the first tunnel endpoint IP address as a first next-hop address of the first IP address, and adds the straight-through mark to the first tunnel endpoint IP address.

In this embodiment, after receiving the first route advertisement message, if the network device determines that a destination address is an IP address of the network device, the network device may obtain the first IP address of the relay device 1 and the straight-through mark by parsing the first route advertisement message, and may learn, through parsing, that a source IP address is the first tunnel endpoint IP address. Then, the network device may add the first IP address to a routing table, and store, in the routing table, the first tunnel endpoint IP address as the first next-hop address of the first IP address, and the first tunnel endpoint IP address corresponds to the straight-through mark. In this way, the network device stores a next-hop address of the first IP address, and the next-hop address corresponds to a straight-through mark.

In an embodiment, processing in which the network device receives the second route advertisement message sent by the relay device 1 may be:

receiving the second route advertisement message through the second tunnel to which the second tunnel endpoint IP address belongs, where the second route advertisement message includes the first IP address and the second tunnel endpoint IP address, tunnel endpoints of the second tunnel are the relay device and the network device, and the second tunnel endpoint IP address is a tunnel endpoint IP address that is the same for each relay device in the target anycast group; and storing the second tunnel endpoint IP address as a second next-hop address of the first IP address.

In this embodiment, after receiving the second route advertisement message, if the network device determines that a destination address is an IP address of the network device, the network device may obtain the first IP address of the relay device 1 by parsing the second route advertisement message, and may learn, through parsing, that a source IP address is the second tunnel endpoint IP address. Then, the network device may add the first IP address to the routing table, and store, in the routing table, the second tunnel endpoint IP address as the second next-hop address of the first IP address. In this way, the network device stores another next-hop address of the first IP address.

In this way, through the foregoing processing, the network device stores two next-hop addresses (namely, the first next-hop address and the second next-hop address) corresponding to the first IP address.

In the foregoing process, only the relay device 1 is used as an example for description, and processing of another relay device in the target anycast group is the same as that in the foregoing process. Details are not described herein again.

A procedure of a method for sending a reply packet is described below with reference to FIG. 8 (a relay device 1 is used as an example for description).

Operation 801: A network device receives a reply packet sent by a DHCP service device, where a destination address of the reply packet is a first IP address of a relay device, a communication connection is established between the relay device and a client, and the client is a client that applies to the DHCP service device for an IP address.

In this embodiment, after receiving an address request packet, the DHCP service device may generate a reply packet corresponding to the address request packet. The reply packet includes an IP address allocated to the client that applies for the IP address, a destination address of the reply packet is the first IP address of the relay device, a communication connection is established between the relay device and the client, and the address request packet is sent by the relay device to the DHCP service device. The DHCP service device sends the reply packet to the connected network device. The network device receives the reply packet sent by the DHCP service device.

Operation 802: The network device determines, based on the destination IP address of the reply packet, a plurality of next-hop addresses corresponding to the destination IP address.

In this embodiment, the network device may view the destination IP address of the reply packet, and then search a routing table, and determine, in the routing table, that the destination IP address corresponds to a plurality of next-hop addresses.

Operation 803: The network device determines a first next-hop address from the plurality of next-hop addresses, where the first next-hop address is a first tunnel endpoint IP address of the relay device and is different from a tunnel endpoint IP address of another relay device in a target anycast group to which the relay device belongs, and a communication connection is established between each relay device in the target anycast group and the client.

In this embodiment, the network device may determine the first next-hop address from the plurality of next-hop addresses. The first next-hop address is the first tunnel endpoint IP address of the relay device, and the first tunnel endpoint IP address is different from the tunnel endpoint IP address of the another relay device in the target anycast group to which the relay device belongs.

In an embodiment, the first next-hop address corresponds to a straight-through mark. The network device may determine, in the plurality of next-hop addresses, a next-hop address corresponding to the straight-through mark, and determine the next-hop address as the first next-hop address.

Operation 804: The network device forwards the reply packet to the relay device based on the first next-hop address.

In this embodiment, the network device may encapsulate the first next-hop address as an outer-layer IP address of the reply packet by using the first next-hop address, and encapsulate a tunnel endpoint IP address of the network device as a source IP address. In addition, the network device encapsulates a source MAC address of the reply packet as a MAC address of the network device, and encapsulate a MAC address of a next hop for forwarding the reply packet to the relay device as a next-hop MAC address. Then, the network device forwards the encapsulated reply packet to a relay device to which the destination address of the reply packet belongs. After receiving the encapsulated response packet, the relay device determines that the outer-layer IP address of the encapsulated response packet is of the relay device, and may decapsulate the encapsulated reply packet, remove outer-layer encapsulation of a tunnel, and obtain a reply packet that carries an IP address to be allocated to the client. Then, the relay device sends the reply packet to a client corresponding to the reply packet (this process is described subsequently).

In this way, because the first tunnel endpoint IP address is different from the tunnel endpoint IP address of the another relay device in the target anycast group to which the relay device belongs, the reply packet is not sent to the another relay device in the target anycast group, so that the reply packet does not detour. Therefore, stability of access of the client is improved, and bandwidth occupation and CPU occupation for the another relay device in the target anycast group can also be reduced.

In this embodiment of this application, the IP address applied for by the client may be an IPv4 address, or may be an IPv6 address. When the client applies for an IPv4 address, an IPv4 DHCP service device allocates the IPv4 address. When the client applies for an IPv6 address, an IPv6 DHCP service device allocates the IPv6 address.

A process in which a client applies for an IPv4 address is described below with reference to FIG. 9. Processing is as follows:

Operation 901: A relay device receives an address request packet sent by a client.

When an IPv4 address is applied for, the address request packet is a discover (discover) packet.

In this embodiment, if the client wants to apply for the IPv4 address, the client may generate the address request packet, and then determine a hash value from the client to each relay device in a target anycast group by using a hash principle. It is assumed that a relay device 1 is selected based on the hash value from the client to each relay device in the target anycast group. For example, a hash value from the client to the relay device 1 is the smallest, and the relay device 1 is selected. Then, the client sends the address request packet to the relay device 1.

Operation 902: The relay device encapsulates a first IP address and a second IP address into the address request packet, where the second IP address is an IP address of an interface on which the relay device receives the address request packet.

Both the first IP address and the second IP address are IPv4 addresses.

In this embodiment, after receiving the address request packet sent by the client, the relay device 1 determines the IP address (namely, the second IP address) of the interface on which the address request packet is received, and then generates a temporary user table. The temporary user table includes a MAC address of the client and an interface name of the interface. Then, the relay device 1 inserts the second IP address into a sub-option numbered 5 (sub5) of an option numbered 82 (option 82) in a configured relay agent information option. The relay device 1 encapsulates the network-wide unique first IP address into a gateway IP address (Giaddr) field of the address request packet.

Operation 903: The relay device encapsulates an IP address of an IPv4 DHCP service device as a destination address of the address request packet.

In this embodiment, the relay device 1 may determine the IP address of the IPv4 DHCP service device corresponding to an interface to which the second IP address belongs, and encapsulate the IP address of the IPv4 DHCP service device as a destination IPv4 address of the address request packet.

Operation 904: The relay device forwards the encapsulated address request packet to a network device through a first tunnel or a second tunnel based on the destination address of the address request packet.

In this embodiment, the relay device 1 may search a routing table and determine that a next hop is a network device connected to the DHCP service device. The relay device 1 may encapsulate an outer-layer IP address and an outer-layer MAC address into an outer layer of the address request packet. The outer-layer IP address includes a source IP address (a tunnel endpoint IP address of the relay device) and a destination IP address (a tunnel endpoint IP address of the network device), and the outer-layer MAC address includes a source MAC address (a MAC address of the relay device) and a destination MAC address (a MAC address used to forward the address request packet to a next-hop of the network device). Then, the relay device 1 searches the routing table and send the encapsulated address request packet to the network device.

Operation 905: The network device receives the encapsulated address request packet, and sends a tunnel-decapsulated address request packet to the IPv4 DHCP service device based on a destination IPv4 address of the tunnel-decapsulated address request packet.

In this embodiment, after receiving the encapsulated address request packet, the network device identifies that a destination IP address of the outer-layer IP address encapsulated at the outer layer is an IP address of the network device, and may decapsulate the address request packet to obtain the tunnel-decapsulated address request packet. Then, the network device sends the tunnel-decapsulated address request packet to the IPv4 DHCP service device.

Operation 906: The IPv4 DHCP service device receives the tunnel-decapsulated address request packet, allocates an IPv4 address to the client, generates a reply packet, and sends the reply packet to the network device.

In this embodiment, after receiving the address request packet, the IPv4 DHCP service device may obtain, through parsing, a second IP address in sub5 of an option 82, and determine, from an address pool stored by the IPv4 DHCP service device, an IP address that belongs to a same network segment as the second IP address as the IP address allocated to the client. The IPv4 DHCP service device generates the reply packet, and the reply packet includes the IP address allocated to the client. The IPv4 DHCP service device may further encapsulate the IP address (namely, the first IP address) in the Giaddr field as a destination IPv4 address of the reply packet. Then, the IPv4 DHCP service device sends the reply packet to the network device.

Operation 907: The network device receives the reply packet sent by the IPv4 DHCP service device, determines, based on the destination IPv4 address of the reply packet, a plurality of next-hop addresses corresponding to the destination IPv4 address, determines a first next-hop address from the plurality of next-hop addresses, and forwards the reply packet to the relay device based on the first next-hop address.

Figure 8:
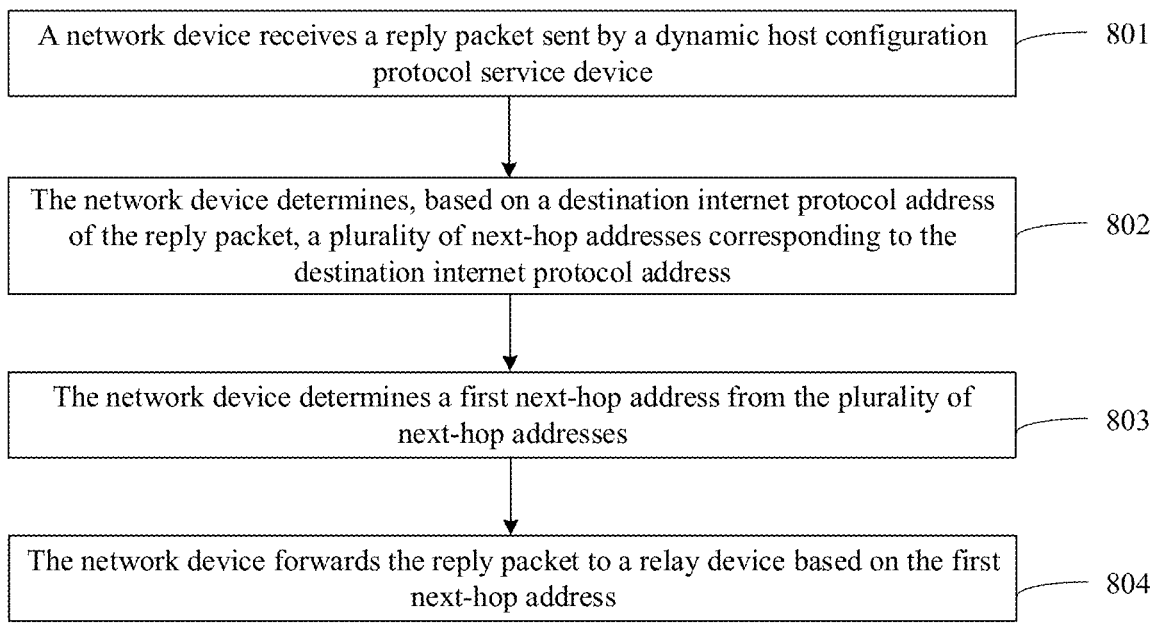
FIG. 8 is a schematic flowchart of a method for sending a reply packet according to an example embodiment of this application.

A procedure of operation 907 is entirely the same as the procedure of FIG. 8. Details are not described herein again.

Operation 908: The relay device receives, through the first tunnel, the reply packet sent by the network device based on a first tunnel endpoint IP address.

Operation 909: The relay device sends, to the client based on a media access control MAC address that is of the client and that corresponds to the reply packet, the IPv4 address that is in the reply packet and that is allocated by the DHCP service device to the client.

In this embodiment, the relay device 1 may send, to the client based on the MAC address and the interface name that are in the established temporary user table, the reply packet that carries the IPv4 address allocated to the client. In this way, the address request packet used by the client to apply for the IPv4 address passes through a same relay device as the reply packet, so that the reply packet does not detour. Therefore, stability of access of the client is improved, and bandwidth occupation and CPU occupation for another relay device in the target anycast group can also be reduced.

Figure 9:
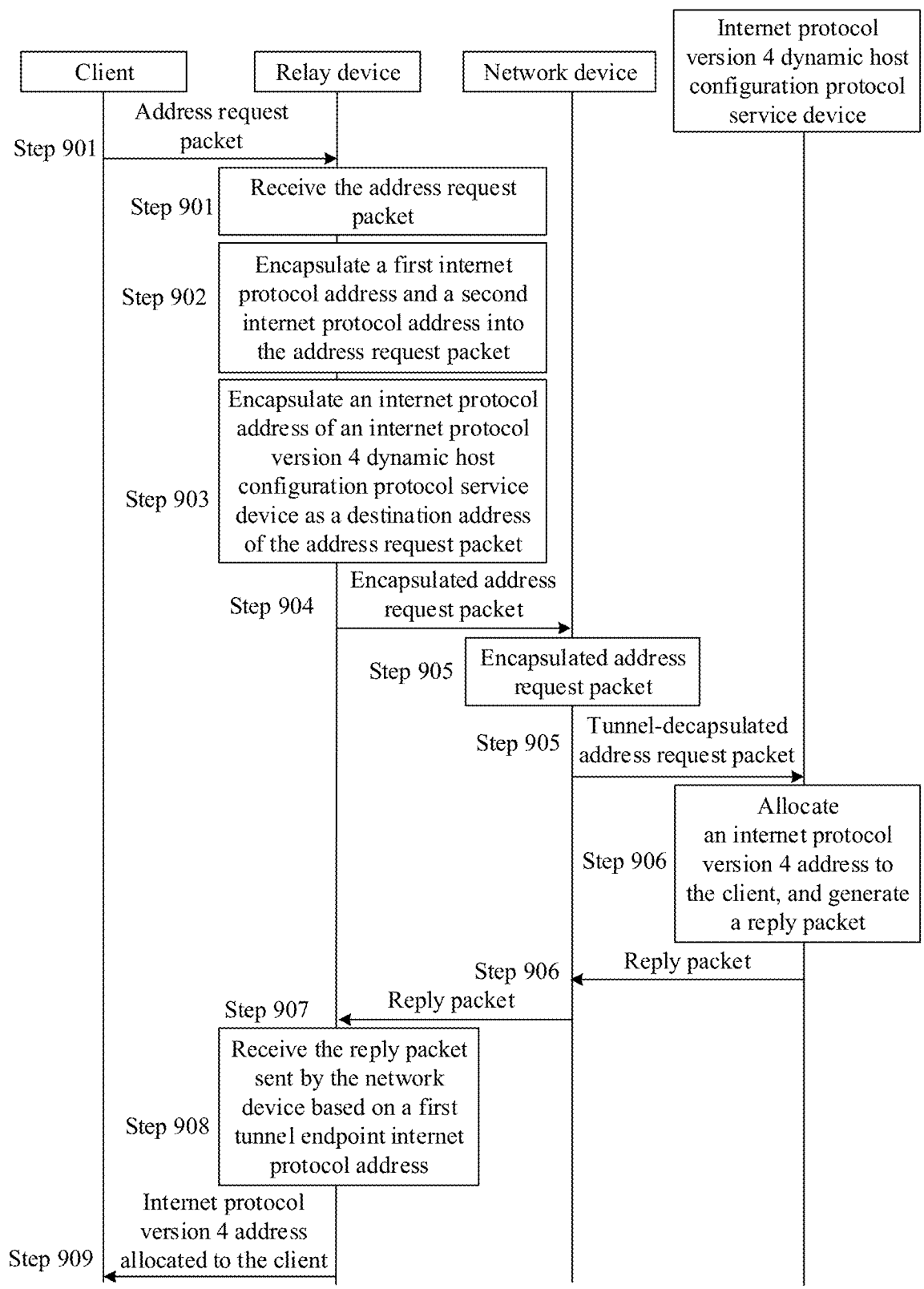
FIG. 9 is a schematic flowchart of application for an IPv4 address according to an example embodiment of this application.

In FIG. 9, that the address request packet is sent to the relay device 1 is merely used as an example for description. Certainly, the address request packet is sent to another relay device in the target anycast group except the relay device 1 based on a same principle. Details are not described in this embodiment of this application.

Figure 10:
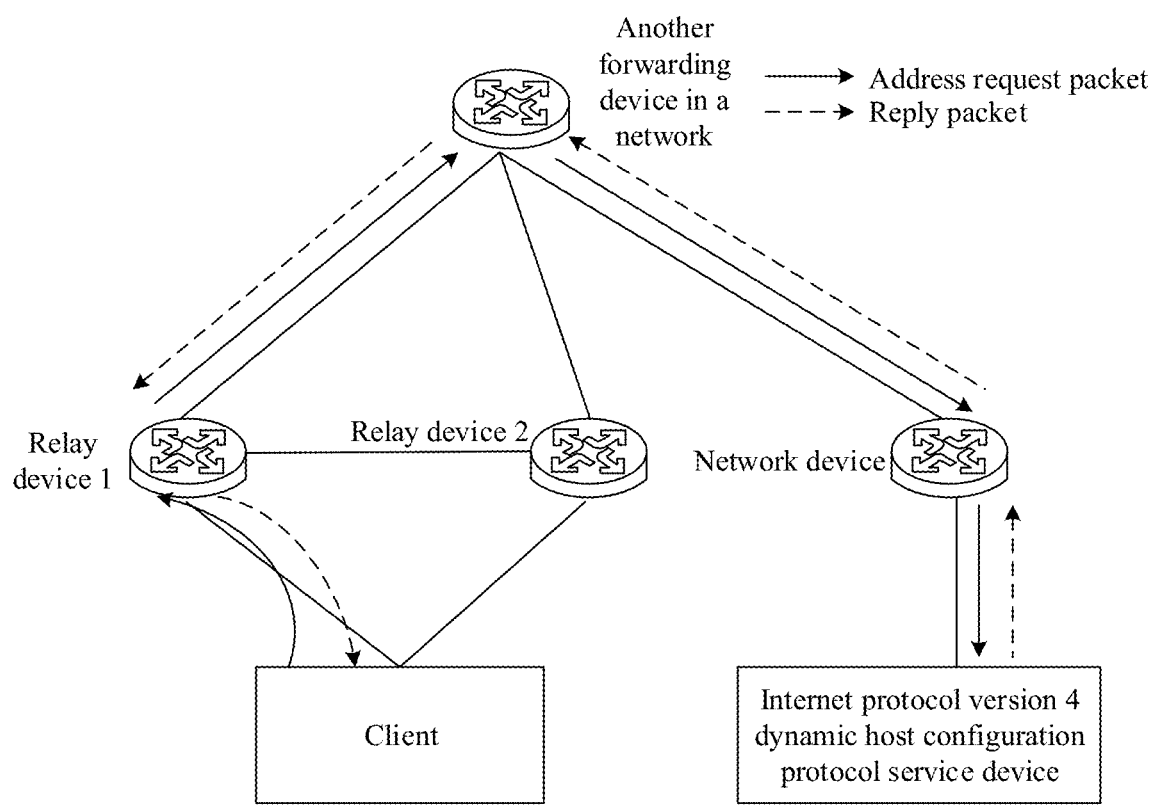
FIG. 10 is a schematic flowchart of application for an IPv4 address according to an example embodiment of this application.

In addition, for ease of understanding, an embodiment of this application further provides a diagram of a packet route for applying for an IPv4 address shown in FIG. 10. A black solid line with an arrow is a route of an address request packet, and a black dashed line with an arrow is a route of a reply packet.

It should be noted that in a scenario of applying for an IPv4 address, a tunnel endpoint IP address may be an IPv4 address.

A process in which a client applies for an IPv6 address is described below with reference to FIG. 11. Processing is as follows:

Operation 1101: A relay device receives an address request packet sent by a client.

When an IPv6 address is applied for, the address request packet is a solicit (solicit) packet.

In this embodiment, if the client wants to apply for the IPv6 address, the client may generate the address request packet, and then select a relay device 1 in a target anycast group by using a hash principle. Then, the client sends the address request packet to the relay device 1.

Operation 1102: The relay device encapsulates a first IP address and a second IP address into the address request packet.

Both the first IP address and the second IP address are IPv6 addresses.

In this embodiment, after receiving the address request packet sent by the client, the relay device 1 determines the IP address (namely, the second IP address) of the interface on which the address request packet is received, and then generates a temporary user table. The temporary user table includes a MAC address of the client and an interface name of the interface. The relay device 1 may encapsulate the address request packet into a relay message option of a newly constructed relay-forward packet. The relay device 1 encapsulates the network-wide unique first IP address as a source IPv6 address, and the relay device 1 encapsulates the second IP address in a link-address field.

Operation 1103: The relay device encapsulates an IP address of an IPv6 DHCP service device as a destination address of the address request packet.

In this embodiment, the relay device 1 may determine the IP address of the IPv6 DHCP service device corresponding to an interface to which the second IP address belongs, and encapsulate the IP address of the IPv6 DHCP service device as a destination IPv6 address of the address request packet.

Operation 1104: The relay device forwards the encapsulated address request packet to a network device through a first tunnel or a second tunnel based on the destination address of the encapsulated address request packet.

In this embodiment, the relay device 1 may search the routing table and determine that a next hop is a network device connected to the IPv6 DHCP service device. The relay device 1 may encapsulate an outer-layer IP address and an outer-layer MAC address into an outer layer of the address request packet. The outer-layer IP address includes a source IP address (a tunnel endpoint IP address of the relay device) and a destination IP address (a tunnel endpoint IP address of the network device), and the outer-layer MAC address includes a source MAC address (a MAC address of the relay device) and a destination MAC address (a MAC address used to forward the address request packet to a next-hop of the network device). Then, the relay device 1 searches the routing table and send the encapsulated address request packet to the network device.

Operation 1105: The network device receives the encapsulated address request packet, and sends a tunnel-decapsulated address request packet to the IPv6 DHCP service device based on a destination IPv6 address of the tunnel-decapsulated address request packet.

In this embodiment, after receiving the encapsulated address request packet, the network device identifies that a destination IP address of the outer-layer IP address encapsulated at the outer layer is an IP address of the network device, and may decapsulate the address request packet to obtain the tunnel-decapsulated address request packet. Then, the network device sends the tunnel-decapsulated address request packet to the IPv6 DHCP service device.

Operation 1106: The IPv6 DHCP service device receives the address request packet, allocates an IPv6 address to the client, generates a reply packet, and sends the reply packet to the network device.

In this embodiment, after receiving the address request packet, the IPv6 DHCP service device may parse the relay-forward packet to obtain the solicit packet through parsing, generate an advertise response packet corresponding to the solicit packet, and encapsulate the advertise response packet into a relay message option of the reply packet. The IPv6 DHCP service device searches an address pool for an ipv6 address in a same network segment based on the second IP address encapsulated in the link-address field, and determines the ipv6 address to be allocated to the client. The IPv6 DHCP service device encapsulates the first IP address as a destination IPv6 address of the reply packet. Then, the IPv6 DHCP service device sends the reply packet to the network device.

Operation 1107: The network device receives the reply packet sent by the IPv6 DHCP service device, determines, based on the destination IP address of the reply packet, a plurality of next-hop addresses corresponding to the destination IP address, determines a first next-hop address from the plurality of next-hop addresses, and forwards the reply packet to the relay device based on the first next-hop address.

A procedure of operation 1107 is entirely the same as the procedure of FIG. 8. Details are not described herein again.

Operation 1108: The relay device receives, through the first tunnel, the reply packet sent by the network device based on a first tunnel endpoint IP address.

Operation 1109: The relay device sends, to the client based on a MAC address that is of the client and that corresponds to the reply packet, the reply packet that carries the IPv6 address allocated by the IPv6 DHCP service device to the client.

In this embodiment, the relay device 1 may send, to the client based on the MAC address and the interface name that are in the established temporary user table, the reply packet that carries the IPv6 address allocated to the client. In this way, the address request packet used by the client to apply for the IPv6 address passes through a same relay device as the reply packet, so that the reply packet does not detour. Therefore, stability of access of the client is improved, and bandwidth occupation and CPU occupation for another relay device in the target anycast group can also be reduced.

Figure 11:
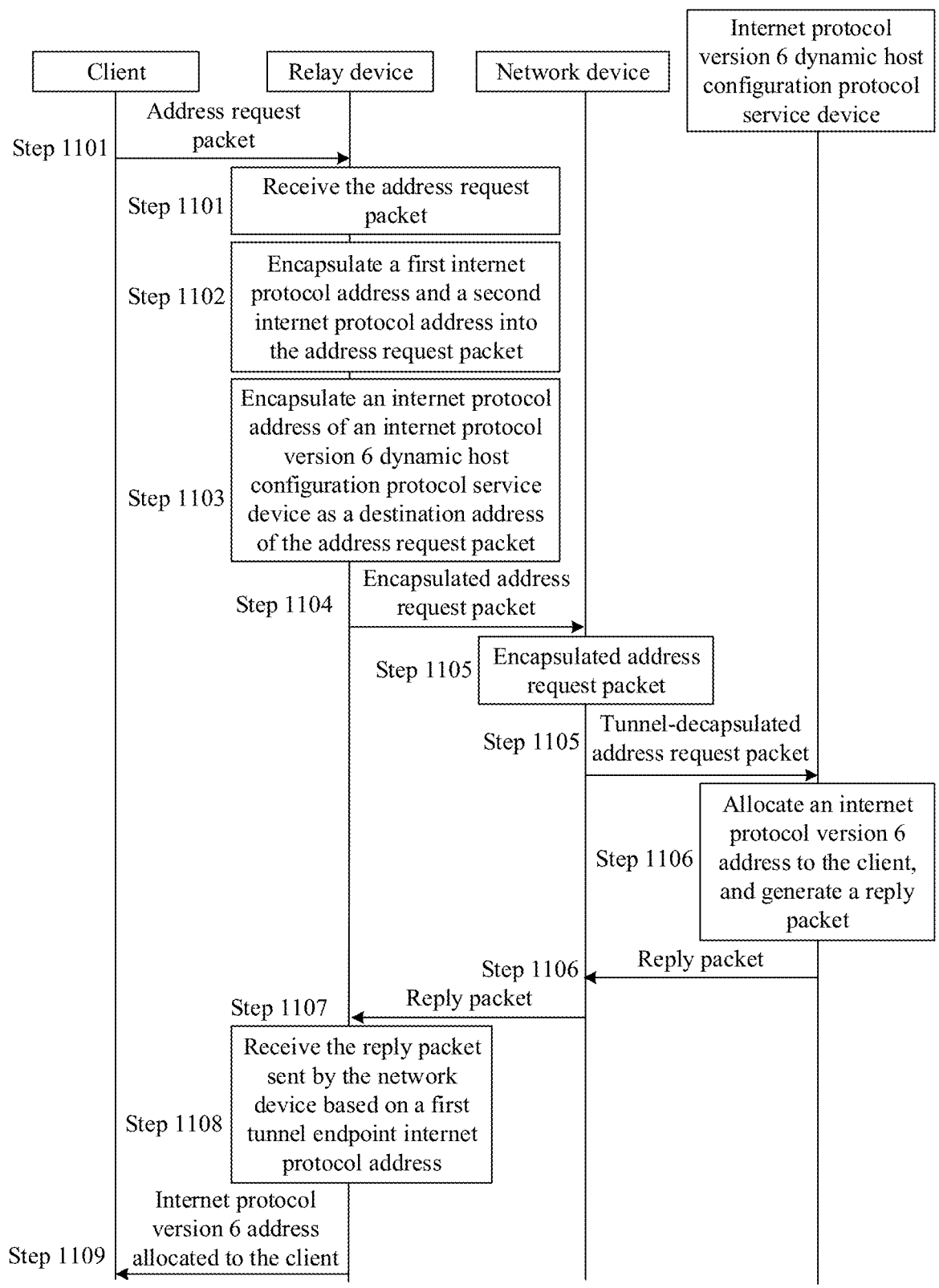
FIG. 11 is a schematic flowchart of application for an IPv6 address according to an example embodiment of this application.

In FIG. 11, that the address request packet is sent to the relay device 1 is merely used as an example for description. Certainly, the address request packet is sent to another relay device in the target anycast group except the relay device 1 based on a same principle. Details are not described in this embodiment of this application.

It should be noted that in a scenario of applying for an IPv6 address, a tunnel endpoint IP address may be an IPv4 address, or may be an IPv6 address.

Figure 12:
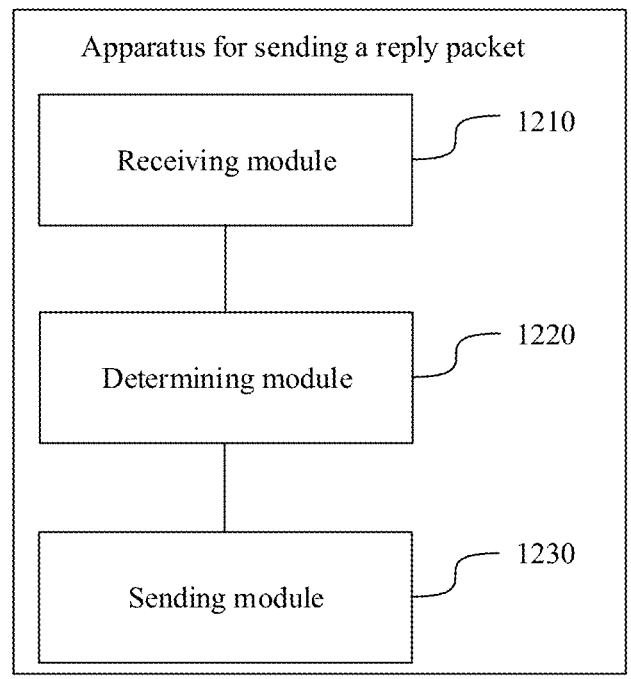
FIG. 12 is a schematic diagram of a structure of an apparatus for sending a reply packet according to an example embodiment of this application.

FIG. 12 is a diagram of a structure of an apparatus for sending a reply packet according to an embodiment of this application. The apparatus may be implemented as a part of the apparatus or the entire apparatus by using software, hardware, or a combination thereof. The apparatus provided in this embodiment of this application may implement the procedures in FIG. 8, FIG. 9, and FIG. 11 in embodiments of this application. The apparatus includes a receiving module 1210, a determining module 1220, and a sending module 130.

The receiving module 1210 is configured to receive a reply packet sent by a DHCP service device. A destination address of the reply packet is a first IP address of a relay device, a communication connection is established between the relay device and a client, and the client is a client that applies to the DHCP service device for an IP address. The receiving module 1210 may be configured to implement a receiving function in operation 801 and an implicit operation included in operation 801, may be configured to implement a receiving function in operation 907 and an implicit operation included in operation 907, and may be configured to implement a receiving function in operation 1107 and an implicit operation included in operation 1107.

The determining module 1220 is configured to: determine, based on the destination IP address of the reply packet, a plurality of next-hop addresses corresponding to the destination IP address; and determine a first next-hop address from the plurality of next-hop addresses, where the first next-hop address is a first tunnel endpoint IP address of the relay device and is different from a tunnel endpoint IP address of another relay device in a target anycast group to which the relay device belongs, and a communication connection is established between each relay device in the target anycast group and the client. The determining module 1220 may be configured to implement determining functions in operation 802 and operation 803 and implicit operations included in operation 802 and operation 803, may be configured to implement a determining function in operation 907 and an implicit operation included in operation 907, and may be configured to implement a determining function in operation 1107 and an implicit operation included in operation 1107.

The sending module 1230 is configured to forward the reply packet to the relay device based on the first next-hop address. The sending module 1230 may be configured to implement a sending function in operation 804 and an implicit operation included in operation 804, may be configured to implement a sending function in operation 907 and an implicit operation included in operation 907, and may be configured to implement a sending function in operation 1107 and an implicit operation included in operation 1107.

In an embodiment, the first next-hop address corresponds to a straight-through mark, and the determining module 1220 is configured to:
determine the first next-hop address from the plurality of next-hop addresses based on the straight-through mark.

In an embodiment, the receiving module 1210 is further configured to:
receive a first route advertisement message through a first tunnel to which the first tunnel endpoint IP address belongs, where the first route advertisement message includes the first IP address, the first tunnel endpoint IP address, and a straight-through mark corresponding to the first tunnel endpoint IP address, and tunnel endpoints of the first tunnel are the relay device and the network device; and
store the first tunnel endpoint IP address as the first next-hop address of the first IP address, and add the straight-through mark to the first tunnel endpoint IP address.

In an embodiment, the receiving module 1210 is further configured to:
receive a second route advertisement message through a second tunnel to which a second tunnel endpoint IP address belongs, where the second route advertisement message includes the first IP address and the second tunnel endpoint IP address, tunnel endpoints of the second tunnel are the relay device and the network device, and the second tunnel endpoint IP address is a tunnel endpoint IP address that is the same for each relay device in the target anycast group; and
store the second tunnel endpoint IP address as a second next-hop address of the first IP address.

In an embodiment, the receiving module 1210 is further configured to receive, through the first tunnel to which the first tunnel endpoint IP address belongs or the second tunnel, an encapsulated address request packet sent by the relay device, where a destination address of the encapsulated address request packet is an IP address of the DHCP service device; and
the sending module 1230 is further configured to send the encapsulated address request packet to the DHCP service device.

Division into the modules in the embodiments of this application is an example, and is merely logical function division and may alternatively be other division in actual implementation. In addition, functional modules in the embodiments of this application may be integrated into a processor, or each of the modules may exist alone physically, or two or more modules are integrated into a module.

The integrated module may be implemented in a form of hardware, or may be implemented in a form of a software functional module.

Figure 13:
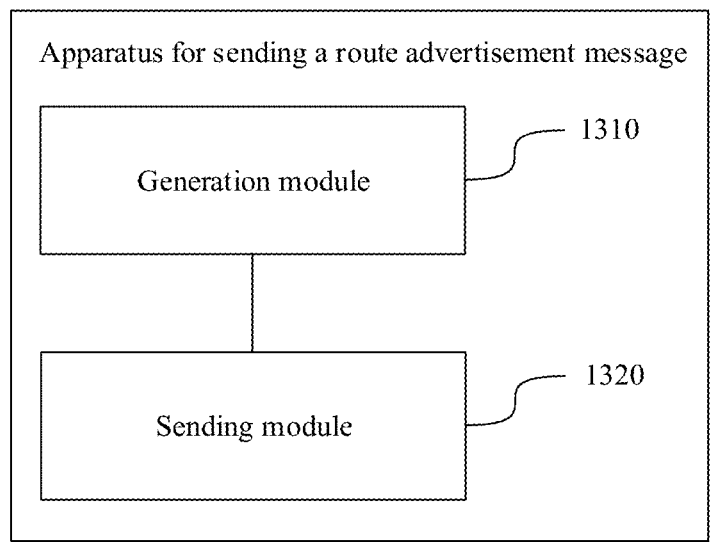
FIG. 13 is a schematic diagram of a structure of an apparatus for sending a reply packet according to an example embodiment of this application.

FIG. 13 is a diagram of a structure of an apparatus for sending a route advertisement message according to an embodiment of this application. The apparatus may be implemented as a part of the apparatus or the entire apparatus by using software, hardware, or a combination thereof. The apparatus provided in this embodiment of this application may implement the procedures in FIG. 7, FIG. 9, and FIG. 11 in embodiments of this application. The apparatus includes a generation module 1310 and a sending module 1320.

The generation module 1310 is configured to generate a plurality of route advertisement messages. Each of the plurality of route advertisement messages includes a first IP address of a relay device and one tunnel endpoint IP address of the relay device, each route advertisement message includes a different tunnel endpoint IP address of the relay device, a tunnel endpoint IP address included in a first route advertisement message in the plurality of route advertisement messages is a first tunnel endpoint IP address, the first tunnel endpoint IP address is different from a tunnel endpoint IP address of another relay device in a target anycast group to which the relay device belongs, and a communication connection is established between each relay device in the target anycast group and a client that applies for an IP address. The generation module 1310 may be configured to implement a generation function in operation 701 and an implicit operation included in operation 701.

The sending module 1320 is configured to send the plurality of route advertisement messages to a network device, to indicate the network device to send a reply packet to the relay device by using the first tunnel endpoint IP address in the first route advertisement message. The reply packet is sent by a DHCP service device to the network device, and a destination IP address of the reply packet is the first IP address. The sending module 1320 may be configured to implement a sending function in operation 702 and an implicit operation included in operation 702.

Figure 14:
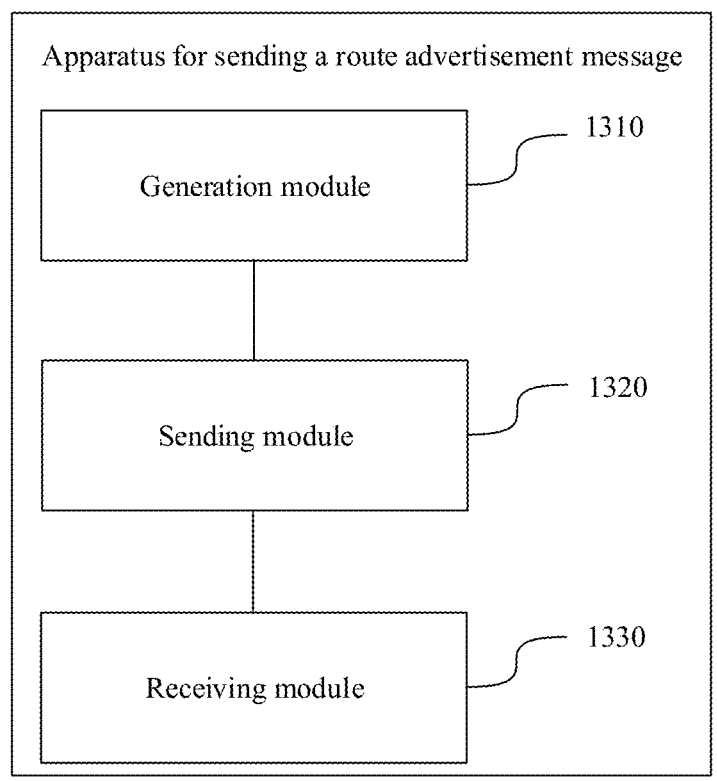
FIG. 14 is a schematic diagram of a structure of an apparatus for sending a reply packet according to an example embodiment of this application.

In an embodiment, as shown in FIG. 14, the apparatus further includes a receiving module 1330, configured to receive the reply packet sent by the network device based on the first tunnel endpoint IP address.

The sending module 1320 is further configured to send, to the client based on a media access control MAC address that is of the client and that corresponds to the reply packet, an IP address that is in the reply packet and that is allocated by the DHCP service device to the client.

In an embodiment, the first route advertisement message further includes a straight-through mark corresponding to the first tunnel endpoint IP address.

In an embodiment, the plurality of route advertisement messages include the first route advertisement message and a second route advertisement message.

The sending module 1320 is configured to:
send the first route advertisement message to the network device through a first tunnel to which the first tunnel endpoint IP address belongs; and
send the second route advertisement message to the network device through a second tunnel to which a second tunnel endpoint IP address belongs, where tunnel endpoints of the first tunnel and the second tunnel are the relay device and the network device, and the second tunnel endpoint IP address is a tunnel endpoint IP address that is the same for each relay device in the target anycast group.

In an embodiment, the apparatus further includes:
a receiving module 1330, further configured to:
receive an address request packet sent by the client;
encapsulate the first IP address and a second IP address into the address request packet, where the second IP address is an IP address of an interface on which the relay device receives the address request packet; and
encapsulate an IP address of the DHCP service device as a destination address of the address request packet.

The sending module 1320 is further configured to forward the encapsulated address request packet to the network device through the first tunnel or the second tunnel based on the destination address.

Division into the modules in the embodiments of this application is an example, and is merely logical function division and may alternatively be other division in actual implementation. In addition, functional modules in the embodiments of this application may be integrated into a processor, or each of the modules may exist alone physically, or two or more modules are integrated into a module. The integrated module may be implemented in a form of hardware, or may be implemented in a form of a software functional module.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of the present invention are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD), a semi-conductor medium (for example, a solid-state drive)).

In this application, terms such as "first" and "second" are used to distinguish between same items or similar items that have basically same functions. It should be understood that there is no logical or time sequence dependency between "first", "second", and "$n^{th}$", and a quantity and an execution sequence are not limited. It should also be understood that although terms such as first and second are used in the following description to describe various elements, these elements should not be limited by the terms. These terms are merely used to distinguish one element from another element. For example, without departing from the scope of the various examples, a first image may also be referred to as a second image, and similarly, a second image may be referred to as a first image. Both the first image and the second image may be images, and in some cases, may be separate and different images.

The term "at least one" in this application means one or more, and the term "a plurality of" in this application means two or more. For example, "a plurality of second packets" means two or more second packets. The terms "system" and "network" may be used interchangeably in this specification.

It should be understood that the terms used in the descriptions of the various examples in the specification are merely intended to describe specific examples but are not intended to constitute a limitation. The terms "one" ("a" and "an") and "the" of singular forms used in the descriptions of the various examples and the appended claims are also intended to include plural forms, unless otherwise specified in the context clearly.

It should further be understood that, the term "and/or" used in this specification indicates and includes any or all possible combinations of one or more items in associated listed items. The term "and/or" in this specification describes an association for describing associated objects and represents that three relationships may exist. For example, A and/or B may represent the following three cases: Only A exists, both A and B exist, and only B exists. In addition, the character "I" in this application usually indicates an "or" relationship between the associated objects.

It should further be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be understood that determining B based on A does not mean that B is determined based on only A. B may alternatively be determined based on A and/or other information.

It should further be understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should further be understood that, the term "and/or" used in this specification indicates and includes any or all possible combinations of one or more items in associated listed items. The term "and/or" in this specification describes an association for describing associated objects and represents that three relationships may exist. For example, A and/or B may represent the following three cases: Only A exists, both A and B exist, and only B exists. In addition, the character "/" in this application usually indicates an "or" relationship between the associated objects.

It should further be understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that "one embodiment", "an embodiment", or "a possible implementation" mentioned throughout specification means that particular features, structures, or characteristics related to the embodiments or implementations are included in at least one embodiment of this application. Therefore, "in one embodiment", "in an embodiment", or "in a possible implementation" appearing throughout this specification does not necessarily refer to a same embodiment. In addition, these particular features, structures, or characteristics may be combined in one or more embodiments in any appropriate manner.

What is claimed is:

1. A network device, connected to a dynamic host configuration protocol (DHCP) service device, wherein the network device comprises:
   at least one processor;
   one or more memories coupled to the at least one processor and storing program instructions, which, when executed by the at least one processor, cause the network device to:
   receive a reply packet sent by the DHCP service device, wherein a destination address of the reply packet is a first internet protocol (IP) address of a first relay device in a target anycast group, and wherein a client applies to the DHCP service device for an IP address;
   determine a plurality of next-hop addresses, wherein each one of the plurality of next-hop addresses is an IP address and corresponds to a destination IP address of the reply packet based on the destination IP address of the reply packet;
   receive a first route advertisement message through a first tunnel to which a first tunnel endpoint IP address of the first relay device belongs, wherein the first route advertisement message comprises a first IP address, the first tunnel endpoint IP address, and a straight-through mark corresponding to the first tunnel endpoint IP address, and wherein tunnel endpoints of the first tunnel are the first relay device and the network device;
   determine a first next-hop address from the plurality of next-hop addresses as the first tunnel endpoint IP address of the first relay device, wherein the first tunnel endpoint IP address of the first relay device is different from a tunnel endpoint IP address of another relay device in the target anycast group, and wherein a communication connection is established between each relay device in the target anycast group and the client; and
   forward the reply packet to the first relay device based on the first next-hop address.

2. The network device according to claim 1, wherein the program instructions further cause the network device to:
   receive a second route advertisement message through a second tunnel to which a second tunnel endpoint IP address belongs, wherein the second route advertisement message comprises a first IP address and the second tunnel endpoint IP address, wherein tunnel endpoints of the second tunnel are the relay device and the network device, and wherein the second tunnel endpoint IP address is the same for each relay device in the target anycast group; and
   store the second tunnel endpoint IP address as a second next-hop address of the first IP address.

3. The network device according to claim 2, wherein the program instructions further cause the network device to:
   receive an encapsulated address request packet sent by the first relay device through the first tunnel or the second tunnel to which the first tunnel endpoint IP address belongs, wherein a destination address of the encapsulated address request packet is an IP address of the DHCP service device; and
   send the encapsulated address request packet to the DHCP service device.

4. An apparatus, applied to a first relay device in a target anycast group, wherein the apparatus comprises:

at least one processor;
one or more memories coupled to the at least one processor and storing program instructions, which, when executed by the at least one processor, cause the apparatus to:
generate a plurality of route advertisement messages comprising a first route advertisement message and a second route advertisement message, wherein each of the plurality of route advertisement messages comprises both a first internet protocol IP address of the first relay device and a different tunnel endpoint IP address of the first relay device, wherein the first route advertisement message in the plurality of route advertisement messages comprises a first IP address, and a first tunnel endpoint IP address that is different from a tunnel endpoint IP address of another relay device in the target anycast group, and wherein a communication connection is established between each relay device in the target anycast group and a client that applies for an IP address;
send the first route advertisement message to a network device through a first tunnel to which the first tunnel endpoint IP address belongs, to indicate the network device to send a reply packet to the first relay device by using the first tunnel endpoint IP address in the first route advertisement message, wherein the reply packet is sent by a dynamic host configuration protocol DHCP service device to the network device, and wherein a destination IP address of the reply packet is the first IP address of the first route advertisement message; and
send the second route advertisement message to the network device through a second tunnel to which a second tunnel endpoint IP address belongs, wherein tunnel endpoints of the first tunnel and the second tunnel are the first relay device and the network device, and the second tunnel endpoint IP address is a tunnel endpoint IP address that is the same for each relay device in the target anycast group.

5. The apparatus according to claim 4, wherein the program instructions further cause the apparatus to:
receive the reply packet sent by the network device based on the first tunnel endpoint IP address; and
send an IP address that is in the reply packet and that is allocated by the DHCP service device to the client based on a media access control (MAC) address that is of the client and that corresponds to the reply packet.

6. The apparatus according to claim 5, wherein the IP address allocated to the client is an internet protocol version 4 (IPv4) address or an internet protocol version 6 (Ipv6) address.

7. The apparatus according to claim 4, wherein the first route advertisement message further comprises a straight-through mark corresponding to the first tunnel endpoint IP address.

8. The apparatus according to claim 4, wherein the program instructions further cause the network device to:
receive an address request packet sent by the client;
encapsulate the first IP address and a second IP address into the address request packet, wherein the second IP address is an IP address of an interface on which the relay device receives the address request packet;
encapsulate an IP address of the DHCP service device as a destination address of the address request packet; and
forward the encapsulated address request packet to the network device through the first tunnel or the second tunnel based on the destination address.

9. A network system, comprising:
a first relay device in a target anycast group, wherein the first relay device is configured to:
generate a plurality of route advertisement messages comprising a first route advertisement message and a second route advertisement message, wherein each of the plurality of route advertisement messages comprises both a first internet protocol (IP) address of the first relay device and a different tunnel endpoint IP address of the first relay device, wherein a first route advertisement message in the plurality of route advertisement messages comprises a first IP address, and a first tunnel endpoint IP address that is different from a tunnel endpoint IP address of another relay device in the target anycast group, and wherein a communication connection is established between each relay device in the target anycast group and a client that applies for an IP address;
send the first route advertisement message to a network device through a first tunnel to which the first tunnel endpoint IP address belongs, to indicate the network device to send a reply packet to the first relay device by using the first tunnel endpoint IP address in the first route advertisement message, wherein the reply packet is sent by a dynamic host configuration protocol DHCP service device to the network device, and a destination IP address of the reply packet is the first IP address of the first route advertisement message; and
send the second route advertisement message to the network device through a second tunnel to which a second tunnel endpoint IP address belongs, wherein tunnel endpoints of the first tunnel and the second tunnel are the first relay device and the network device, and the second tunnel endpoint IP address is a tunnel endpoint IP address that is the same for each relay device in the target anycast group.

10. The network system according to claim 9, wherein the relay device is further configured to:
receive the reply packet sent by the network device based on the first tunnel endpoint IP address; and
send an IP address that is in the reply packet and that is allocated by the DHCP service device to the client based on a media access control MAC address that is of the client and that corresponds to the reply packet.

11. The network system according to claim 10, wherein the IP address allocated to the client is an internet protocol version 4 (Ipv4) address or an internet protocol version 6 (Ipv6) address.

12. The network system according to claim 9, wherein the first route advertisement message further comprises a straight-through mark corresponding to the first tunnel endpoint IP address.

13. The network system according to claim 9, wherein the relay device is further configured to
receive an address request packet sent by the client;
encapsulate the first IP address and a second IP address into the address request packet, wherein the second IP address is an IP address of an interface on which the relay device receives the address request packet;
encapsulate an IP address of the DHCP service device as a destination address of the address request packet; and
forward the encapsulated address request packet to the network device through the first tunnel or the second tunnel based on the destination address.

* * * * *